(12) United States Patent
Hall

(10) Patent No.: US 7,630,331 B2
(45) Date of Patent: Dec. 8, 2009

(54) POWER CONTROL TECHNIQUES FOR WIRELESS DEVICES

(75) Inventor: Steven D. Hall, Olivenhain, CA (US)

(73) Assignee: Broadcom Corporation, Irvine, CA (US)

(*) Notice: Subject to any disclaimer, the term of this patent is extended or adjusted under 35 U.S.C. 154(b) by 562 days.

(21) Appl. No.: 11/527,982

(22) Filed: Sep. 27, 2006

(65) Prior Publication Data

US 2008/0076364 A1 Mar. 27, 2008

(51) Int. Cl.
*G08C 17/00* (2006.01)
(52) U.S. Cl. .................................. 370/311
(58) Field of Classification Search ............. None
See application file for complete search history.

(56) References Cited

U.S. PATENT DOCUMENTS

| | | | |
|---|---|---|---|
| 6,856,789 B2 | 2/2005 | Pattabiraman | |
| 2005/0229226 A1 | 10/2005 | Relan | |
| 2006/0087996 A1* | 4/2006 | Stephens | 370/311 |
| 2007/0008915 A1* | 1/2007 | Kim et al. | 370/311 |
| 2008/0046547 A1* | 2/2008 | Olsen et al. | 709/220 |
| 2009/0080350 A1* | 3/2009 | Bennett et al. | 370/311 |
| 2009/0092069 A1* | 4/2009 | Rhee | 370/311 |

* cited by examiner

*Primary Examiner*—Ajit Patel
(74) *Attorney, Agent, or Firm*—Brake Hughes Bellermann LLP

(57) ABSTRACT

Various embodiments are disclosed relating to wireless systems, and also relating to power control techniques for wireless devices. One disclosed embodiment comprises a wireless receiver that includes a processing circuit. In one example embodiment, at least a portion of the processing circuit may wake from a low power state to an operational state to receive and process only a portion of an ID packet during the operational state. The portion of the ID packet that is received and processed may be less than a full ID packet, which may provide power savings.

27 Claims, 5 Drawing Sheets

POWER CONTROL TECHNIQUES FOR WIRELESS DEVICES

BACKGROUND

Wireless interface devices have become popular because they allow users to control and provide input to the host computer, while freeing users from the entanglement and limitations of traditional wired interface devices. However, a disadvantage of wireless devices is a limited battery lifetime. To conserve battery power, various circuits in the wireless interface device may remain in a sleep or low power state during certain periods. The wireless interface device may consume significant battery power after transitioning from a low power state to an operational or high power state to perform some functions, such as scanning for and receiving packets (such as identification packets). For example, wireless device may scan for ID packets, e.g., to determine if there is a device that either wants to pair with it or to send it information. Therefore, there may be a need for techniques to reduce the consumption of power in wireless devices.

SUMMARY

Various embodiments are disclosed relating to wireless systems and to power control techniques for wireless devices. One example embodiment may include waking at least a portion of a processing circuit of a wireless receiver from a low power state to an operational state, receiving only a portion of an ID packet that is less than a full ID packet, processing the portion of the ID packet, correlating the processed portion of the ID packet to generate a correlation result, and comparing the correlation result to a correlation threshold.

Another example embodiment may include a wireless receiver, the wireless receiver may include an analog processing circuit and a digital processing circuit. At least a portion of the analog processing circuit and/or digital processing circuit may be configured to wake from a low power state to an operational state. The analog processing circuit may receive and process only a portion of an ID packet during the operational state, the portion of the ID packet being less than a full ID packet. The digital processing circuit may include a correlator coupled to the analog processing circuit to correlate a processed portion of the ID packet and to output a correlation result. A detector circuit may compare the correlation result to a correlation threshold.

According to another example embodiment, a processing circuit is provided and may be adapted for operation in a wireless receiver. The processing circuit may be configured to: wake at least a portion of the processing circuit of the wireless receiver from a low power state to an operational state, receive, during the operational state, only a portion of an ID packet that is less than a full ID packet, process the portion of the ID packet, correlate the processed portion of the ID packet to generate a correlation result, and compare the correlation result to a correlation threshold.

DETAILED DESCRIPTION

Figure 1:
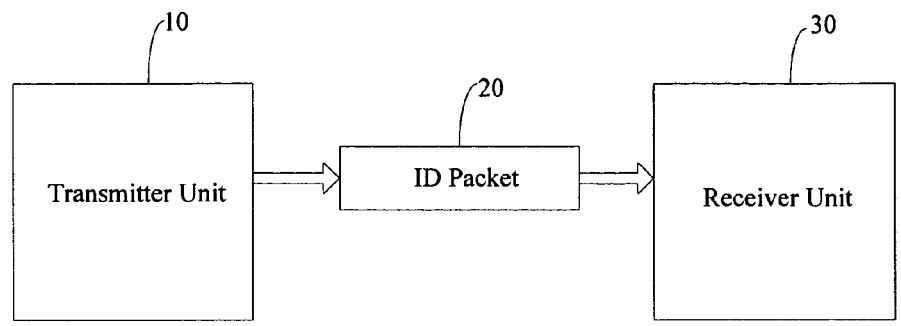
FIG. 1 is a block diagram of a wireless system according to an example embodiment.

FIG. 1 is a block diagram of a wireless system according to an example embodiment. As shown in FIG. 1, a wireless system 8 may include a wireless transmitter unit 10 (or wireless transmitting device) in wireless communication with a wireless receiver unit 30 via wireless communication link. For example, transmitter unit 10 and receiver unit 30 may each be a PC, laptop computer, cell phone, PDA (personal digital assistant), wireless headset, or any other wireless device. In an example embodiment, transmitter unit 10 may be a Bluetooth compatible cell phone, and receive unit 30 may be a Bluetooth compatible wireless headset, although this is merely an example, and any devices and protocols may be used. For example, transmitter unit 10 (e.g., cell phone) may be transmitting wireless audio or speech signals via a Bluetooth wireless link to receiver unit (e.g., wireless headset). Although not shown, both transmitter unit 10 and receiver unit 30 may include wireless transceivers (transmitter/receivers) to both send and receiver wireless signals.

As shown in FIG. 1, transmitter unit 10 may send (or transmit) an identification packet 20 ("ID packet") to a receiver unit 30. For example, transmitter unit 10 may send either a page directed to a particular receiver unit 30, or an inquiry directed to any receiver unit 30. As an example, Bluetooth-type transmitter units 10 in paging mode may send a Bluetooth-type ID packet 20.

Bluetooth-type receiver unit 30 (and other wireless devices) may enter a page scan mode to determine whether there is an incoming message by scanning for an ID packet 20, or other frame or message, from a transmitter unit 10, which may be either a paging device or an inquiring device. A paging device may send an ID packet 20 with a particular receiver unit's 30 address, whereas an inquiry device sends an ID packet 20 which may be recognized by any Bluetooth-type receiver unit 30 within range.

A Bluetooth device or receiver unit may typically operate in one of three different page scanning modes, denoted $R_0$, $R_1$, and $R_2$. In $R_0$ mode, the receiver unit 30 is always "on," or listening for an ID packet 20. In the $R_0$ mode, the listening components of the receiver unit 30 are always on and consuming power. In $R_1$, the receiver unit 30 "wakes up," or listens, every 1.28 seconds (or in some cases no less than every 1.28 seconds), whereas in $R_2$, the receiver unit 30 wakes up or listens every 2.56 seconds (or for example, no less than every 2.56 seconds). In both $R_1$ and $R_2$ modes, the receiver unit 30 may typically listen for 11.25 milliseconds before returning to "sleep" mode. Thus, the listening components of the receiver unit 30 are consuming power for 11.25 milliseconds of each cycle, the cycle lasting either 1.28 seconds for $R_1$ mode or 2.56 seconds for $R_2$ mode. If the receiver unit 30 receives an ID packet 20 that the receiver unit 30 recognizes as a valid page, then the receiver unit 30 replies to the transmitter unit 10 with the receiver unit's 30 own address, informing the transmitter unit 10 of the receiver unit's 30 presence.

Figure 2:
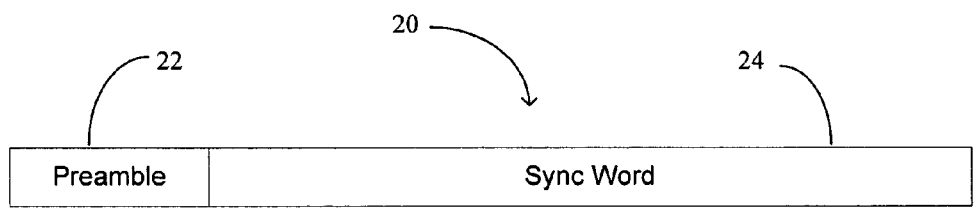
FIG. 2 is a block diagram of an identification packet according to an example embodiment.

FIG. 2 is a block diagram of an identification packet according to an example embodiment. Identification (ID) packet 20 may include a preamble 22, and a sync (or synchronization) word 24. The preamble 22 may include four bits of information, such as, for example, a fixed zero-one pattern of four symbols, and may be transmitted over a time period of four microseconds, although other time periods may be used. In an example embodiment, the zero-one pattern may be a 1010 if the first bit of the sync word 24 is 1, or 0101 if the first bit of the sync word 24 is 0, for example. The sync word 24 may include, for example, sixty-four bits of information derived from a twenty-four bit address, transmitted over a time period of sixty-four microseconds. The construction of the sync word 24, in some cases, may be designed to create a large Hamming distance between sync words 24 based on different addresses. In an example embodiment where ID packet 20 may include a Bluetooth identification packet, the ID packet 20 may be sixty-eight bits of information transmitted over a time period of sixty-eight microseconds, with one bit transmitted each microsecond, for example. When in inquiry or page mode, the transmitter unit 10 may frequency hop through the 2.4 GHz frequency band by repeatedly sending two ID packets 20 and listening for two ID packet responses at different frequencies 3,200 times per second, creating a residence time of 312.5 microseconds per frequency, for 5.12 seconds, minimizing the possibility that the identification packet 20 will not be received and recognized by the receiver unit 30, according to an example embodiment.

Figure 3:
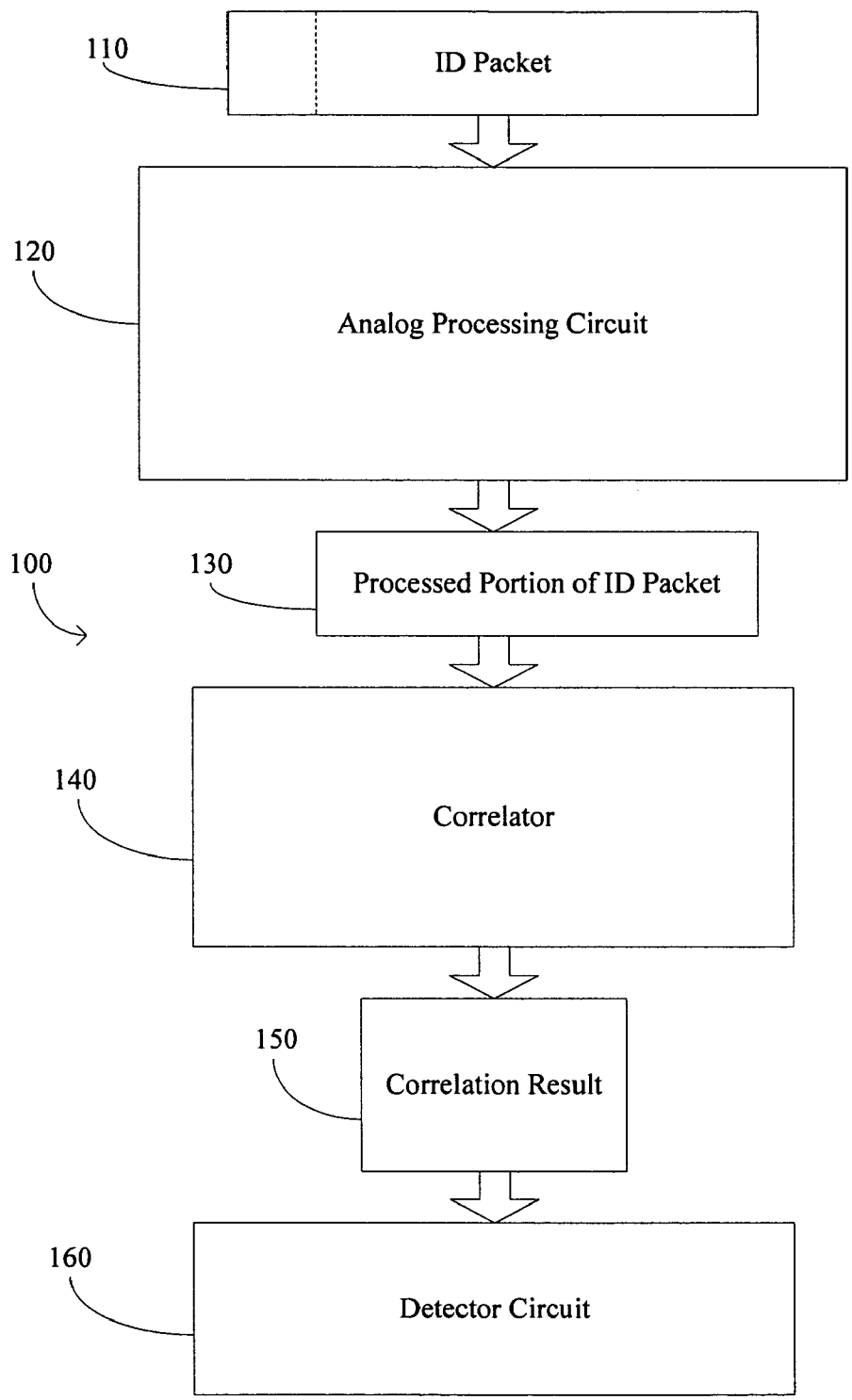
FIG. 3 is a block diagram illustrating operation of a wireless receiver according to an example embodiment.

FIG. 3 shows a block diagram of a wireless receiver unit 100 according to an example embodiment. According to an example embodiment, receiver unit 100 may include a number of circuits, such as an analog processing circuit 120, a correlator 140 and a detector circuit 160, for example, among other circuits.

After waking from a low power state to an operational state, analog processing circuit 120 may receive and process a portion of an ID packet (e.g., less than a full ID packet), according to an example embodiment. In an example embodiment, the analog processing circuit 120 may be configured to wake from a low power state to an operational state periodically, remaining in the operational state for a time period less than a receipt time for a full ID packet 110, which, in the case of a Bluetooth-type ID packet, may be that analog processing circuit may remain in the operational state for less than sixty-eight microseconds. The analog processing circuit 120 may be further configured to perform analog processing functions on the portion of the ID packet 110, and to output a processed portion 130 of the ID packet to the correlator 140. According to an example embodiment, by remaining in an operational state for a relatively short period of time, e.g., for a period of less than a full ID packet, power consumption of the receiver unit 100 may be decreased.

The correlator 140 may also periodically be placed in a sleep or low power state, or alternatively, may always remain in an operational state. Correlator 140 may receive and correlate the processed portion 130 of the ID packet with an ID or address of the receiver unit 100, for example, and may output a correlation result 150.

Detector circuit 160 may also periodically be placed in a sleep or low power state, or alternatively, may always remain in an operational state. Detector circuit 160 may compare the correlation result 150 to a correlation threshold to determine whether the ID packet 110 was the product of a page or inquiry, or directed to receiver unit 100. Alternatively, the correlator 140 and the detector circuit 160 may remain on during an entire scanning period, e.g., during the entire 11.25 ms scanning period.

According to an example embodiment, because only a portion of the ID packet may be received and processed by analog processing circuit 120 during an operational state of the analog processing circuit 120, a lower correlation threshold may be used (e.g., as compared to a correlation threshold that may ordinarily be used for the correlation of a complete ID packet). By having a portion of receiver unit (e.g., analog processing circuit 120) remain in a low power state for a longer period of time and then receiving and processing only a portion of the ID packet 1110, this may allow the receiver unit 100 to conserve power by waking the analog processing circuit 120 for shorter portions of time and still recognize a page. In addition, by using only a portion of an ID packet for correlation, this may, in some case, increase the likelihood of falsely recognizing a page or false hit (e.g., where a correlation result that may exceed the correlation threshold may be based on noise rather than a valid page).

According to an example embodiment, as noted above, receiving, processing and correlating only a portion of an ID packet may increase the likelihood of a false hit (e.g., a correlation result that may exceed the correlation threshold is based on noise or other erroneous signals, and not based on a valid page). Therefore, to decrease the occurrences of false hits or false correlation results, some additional processing may be performed to confirm the validity of the page or correlation result.

In one example embodiment, if a correlation result 150 from a processed portion 130 of an ID packet exceeds a threshold, the receiver unit 100 may then receive and process a new full ID packet 110, and the detector circuit 160 may then compare the new correlation result 150 to a higher correlation threshold, to reflect the receipt of the full ID packet 110 rather than a partial ID packet 110. If the new correlation result for the full ID packet exceeds the high correlation threshold (for the full ID packet), then this may confirm the validity of the page or inquiry from the transmitter unit 10. In another example embodiment, if the correlation result 130 for the partial ID packet exceeds the correlation threshold (e.g., indicating that the correlation was the product of a page or inquiry), the receiver unit 100 may respond by transmitting reply message or packet including its address back to the pager unit to inform the pager unit of the receiver unit's 100 presence. A receiver unit may alternatively perform both of these operations, e.g., correlating a second (full) ID packet and then sending a reply to the transmitter unit 10. Additional (or alternative) operations or processing may also be performed by receiver unit 30 to confirm the validity of the page or correlation result, as described in greater detail with respect to FIG. 5.

Figure 4:
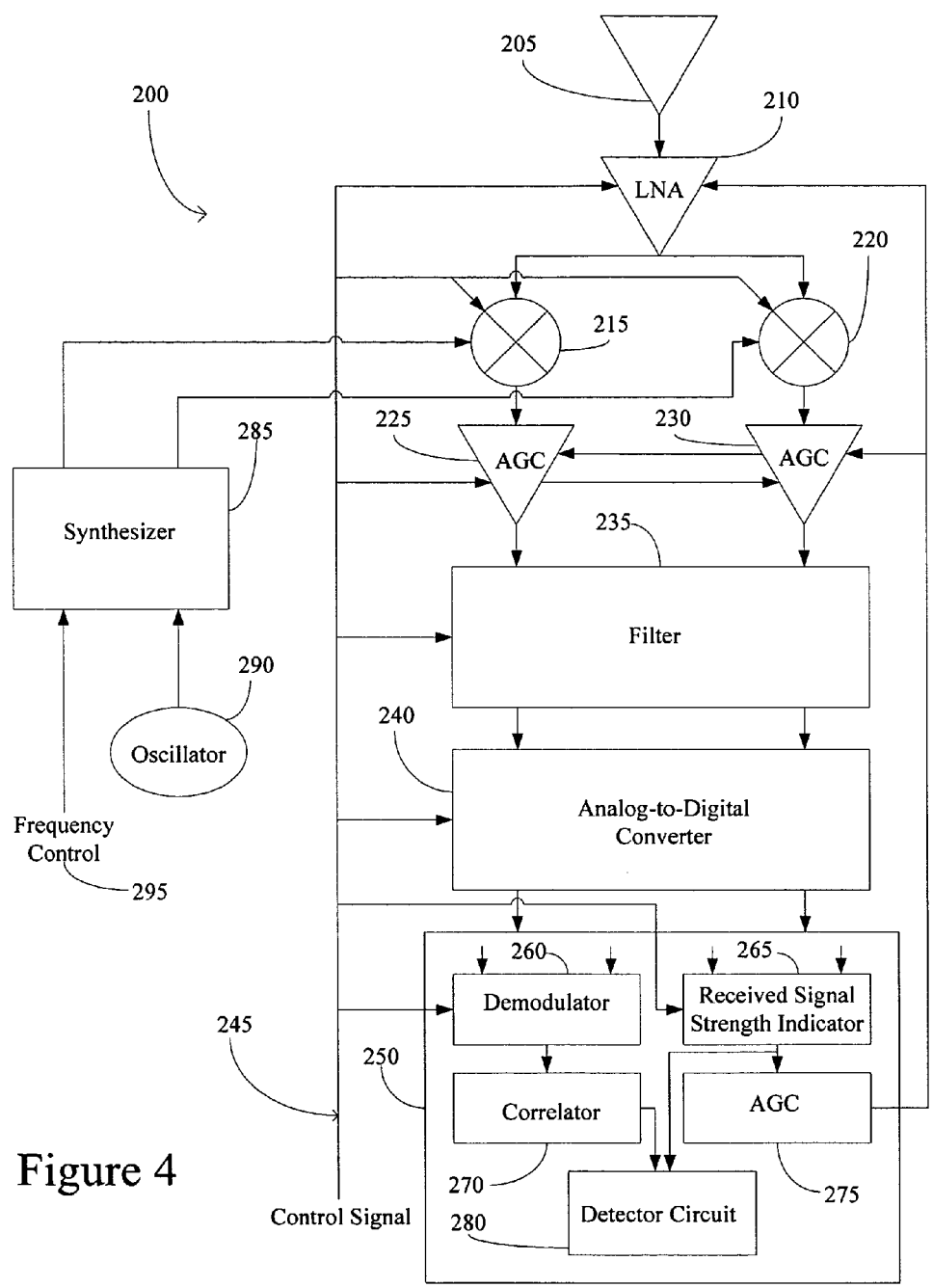
FIG. 4 is a circuit diagram of a wireless receiver according to an example embodiment.

FIG. 4 is a circuit diagram of a wireless receiver according to an example embodiment. Wireless receiver 200 may be an example of a receiver unit 30, for example. Referring to FIG. 4, a wireless receiver 200 may include an antenna 205; and an analog processing circuit. The analog processing circuit, for example, may include a low noise amplifier 210, a first mixer 215 and a second mixer 220, a first automatic gain control 225 and a second automatic gain control 230, a filter 235, an analog-to-digital converter 240, and/or other circuits. These are merely examples of the kinds of circuits or blocks that may be provided within an analog processing circuit 120, and which a portion of such analog processing circuit 120 may be placed into a low power state for periods of time (e.g., such as during receipt of a portion of an ID packet), e.g., to conserve power and improve battery life.

The wireless receiver 200 may also include a number of additional circuits, which may or may not enter low power state during receipt of a portion of an ID packet. For example, receiver 200 may include a synthesizer 285 that may receive a frequency control signal 295. Also, an oscillator 290 may output a signal to synthesizer 285. Frequency synthesizer may generate signals at one or more selected frequencies, and output these signals to various circuits. A signal processing circuit 250 may include a demodulator 260 to demodulate received signals, a received signal strength indicator 265 which may indicate received signal strength of received signals (e.g., from analog processing circuits or other circuits), a correlator 270 to correlate a received signal, an automatic gain control 275, and a detector circuit 280. Detector circuit 280 may compare the amplitude of a correlation output from correlator 270 to a threshold, for example. The signal processing circuit 250 may also be referred to as a digital processing circuit, for example.

In an example embodiment, one or more of these additional circuits may enter a lower power state along with at least a portion of the analog processing circuit during a portion of receipt of the ID packet, While in another example embodiment, some of these additional circuits (e.g., synthesizer 285, oscillator 290, demodulator 260, correlator 270, detector circuit 280, RSS indicator 265, etc.) may remain in a high power or operational state throughout receipt of a full ID packet.

According to an example embodiment, the analog processing circuit may receive a portion of an ID packet via the antenna 205. In an example embodiment, at least a portion of the analog processing circuit may be configured to wake from a low power state to an operational state to perform analog processing functions on the portion of the ID packet, as discussed with reference to FIG. 3, and send the processed portion of the ID packet to the demodulator 260. The demodulator 260, may demodulate the analog processed portion of the ID packet to generate a demodulated portion of the ID packet. Alternatively, the wireless receiver 200 may not utilize a demodulator 260, and the analog processing circuit may send the processed portion of the ID packet directly to the correlator 270. Correlator 270 may correlate the demodulated portion of the ID packet against an address or other information.

The oscillator 290 and frequency control 295 may be configured to control the frequency of the synthesizer 285. The synthesizer 285, in turn, may be configured to serve as an oscillator for the first mixer 215 and the second mixer 220.

A control signal 245 may be provided to turn on and off one or more circuits that may be placed into a low power state during receipt of at least a portion of the ID packet. For example, control signal 245 may turn on and off one or more circuits associated with the analog processing circuit, such as low noise amplifier 210, mixers 215 and 220, automatic gain control 225 and 230, the filter 235, the analog-to-digital converter 240, etc. The control signal 245 may also be input to other circuits, such as demodulator 260. The control signal 245 may turn on and off the circuits for different durations. For example, control signal 245 may turn off the circuits associated with the analog processing circuit, such as the filter 235 and automatic gain control 225 and 230 for a shorter time than the other circuits in the analog processing circuit or the signal processing circuit 250.

In an example embodiment, demodulator 260 may output zeros to correlator 270 when analog processing circuits are placed into a low power state, based on control signal 245. The output of zeros by demodulator 260 during an inactive or low power state of analog processing circuit may avoid any noise or spurious signals from being received and demodulated and then demodulator 260 outputting some random signals (based on these spurious signals from demodulator 260) to correlator 270. Thus, by having demodulator 260 output zeros or other known signals while at least a portion of the analog processing circuit is in a low power state, this may avoid erroneous correlations at correlator 270, for example.

The correlator 270 may correlate either the processed portion of the ID packet or the demodulated portion of the ID packet with an ID or an address of the wireless receiver 200, for example, to generate a correlation result, and send the correlation result to the detector circuit 280. The detector circuit 280 may then compare the correlation result to a correlation threshold. The detector circuit 280 may determine that there is a match if the correlation result equals or exceeds the correlation threshold.

The above-described configurations and processes enable the wireless receiver 200 to determine a match based on receipt of less than a full ID packet, which may, for example, allow a device or receiver to consume less power by keeping at least a portion of the receiver, such as at least a portion of the analog processing circuitry 120 and/or signal processing circuit 250, off for a fraction (or portion) of each period that is less than a receipt time for a full ID packet. For example, a portion of the analog processing circuitry and/or signal processing circuit 250 may be turned off less than sixty-eight microseconds every sixty-eight microsecond period of the 11.25 msec listening time of each 1.28 second or 2.56 second period in the example of a Bluetooth-type wireless receiver 200. This is merely one example. However, it is possible that the above-described configurations and processes could determine that a match exists when random noise or other signals caused the wireless receiver 200 to receive a sequence of signals matching a pattern in the correlator 270 (e.g., a false hit at the correlator 270). The received signal strength indicator 265 may be configured to assist the detector circuit 280 in excluding noise as a possible cause of the match.

In addition to sending the processed portion of the ID packet to the demodulator 260 or correlator 270, the analog processing circuit may also send the processed portion of the ID packet to the received signal strength indicator 265. The received signal strength indicator 265 may send a signal strength indication to a third automatic gain control 275 (which may communicate with the low noise amplifier 210 to maintain a desired amplitude) and to the detector circuit 280.

Figure 5:
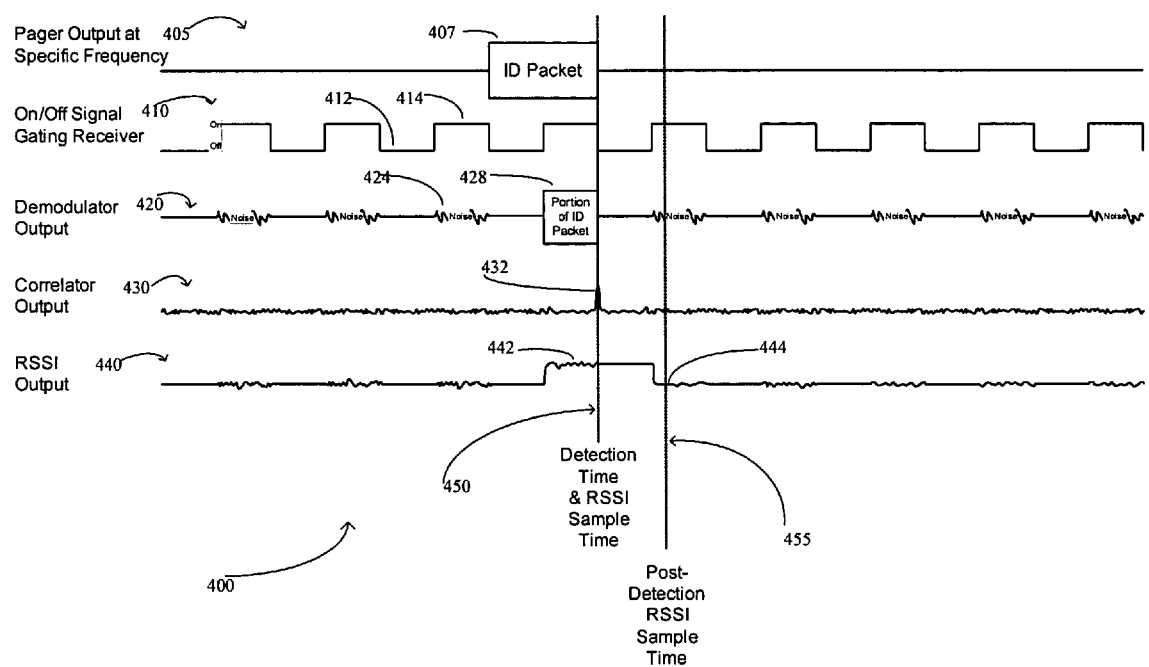
FIG. 5 is a timing diagram illustrating operation of a wireless receiver according to an example embodiment.

The detector circuit 280 may compare the correlation result to the signal strength indication as functions of time, as shown in FIG. 5. FIG. 5 shows a graphical representation 400 comprising a pager output 405, an on/off control signal 410 (shown in FIG. 4 as on/off control signal 245) of the wireless receiver 200, a demodulator output 420, a correlator output 430, and a received signal strength indicator output 440, all as a function of time, according to an example embodiment. As shown in FIG. 5, the pager output 405 illustrates receipt of a full ID packet 407. The on/off signal 410 of the wireless receiver 200 may include an off mode 412 and an on mode 414. The on/off signal 410 may not be drawn to scale in FIG. 5: For example, in an example embodiment, the off mode 412 may be significantly longer than the on mode 414. As noted above, the on/off signal 410 (e.g., control signal 245) may control an operating mode of a portion of the receiver, such as the analog processing circuit (or at least a portion of the analog processing circuit, for example) and a digital processing circuit of the receiver 200, for example, such as placing the analog and/or digital processing circuit in a low power state during off cycles (such as off cycle 412 and these time durations may be different, for the analog, and digital processing circuits), and placing the analog processing circuit in an operating or high power mode during on cycles (such as on cycle 414). When placed in a lower power state, the analog processing circuit does not process the received signals, and therefore, may save power.

The demodulator output 420 may output a demodulated portion of the ID packet 407 when the on/off signal 410 is in an on cycle (e.g., 414), and may be zeroes during the times when the on/off signal 410 is in off mode (e.g., 412.) If no signal is being demodulated by demodulator output may include noise 424. Thus, outputting zeroes at modulator output 420 may prevent noise from generating erroneous correlations, for example, although this is not required. When an ID packet 407 is received at receiver 200, the analog processing circuit may initially be in a low power or off state as shown by the low or zero on the on/off signal 410 at the beginning of the received ID packet 407. On/off signal 410 may then go high, to an on cycle (e.g., from off cycle 412 to on cycle 414), thereby causing the analog processing circuit to wake from a lower power state to an operational or high power state and perform analog processing on a portion 428 of the received ID packet. The analog processed portion of the ID packet may then be input to the demodulator for demodulation. The demodulator output 420 may include the demodulated portion of the ID packet 428. This portion of the demodulated ID packet may be input to the correlator. The correlator may correlate the portion of the demodulated ID packet (or other output signal) with an address or ID, for example, and generate a correlation result.

The correlator output 430 may reach a peak 432 upon the wireless receiver's 200 receipt and correlation of the portion of the ID packet 428. The peak 432, e.g., if greater than a correlation threshold, may indicate that the sequence in the portion of the ID packet 428 matches a pattern in the detector circuit 280, e.g., a correlation. The detector circuit 280 may compare the peak 432 to the correlation threshold and may register a time which is about a peak of the correlation result 450 and a time which is after the about the peak of the correlation result 455.

The received signal strength indicator output 440 communicates the signal strength of the analog processed portion of the ID packet 407, which is used to measure a first received signal strength 442 at the about the peak 432 of the correlation result 450, and a second received signal strength 444 at the after the about the peak of the correlation result 455.

In some embodiments, the detector circuit 280 may determine that the portion of the ID packet 428 resulted from a valid page at least in part when the first received signal strength 442 exceeds a first signal strength threshold. Typically, random noise that may have matched a pattern in the detector circuit 280 will not create a strong enough signal to exceed the first signal strength threshold. Therefore, comparing the first received signal strength 442 to the first signal strength threshold may serve to exclude most false alarms caused by noise matching the pattern in the detector circuit 280.

The detector circuit 280 may also compare, after the correlation peak 432, 450, the second received signal strength 444 to a second received signal strength threshold. Typically, the signal strength of a page will fall off some period of time after it causes the correlator output 430 to form a peak 432. Thus, as shown in FIG. 5, the received signal strength output 440 will fall or decrease after about the peak (e.g., 432) of the correlation result 450. For example, if the signal strength of the received signal does not decrease substantially after about the peak of the correlation result, this may indicate a false hit or a false correlation, for example. The time after about the peak (e.g., 432) of the correlation result 455 may be chosen such that the page will have caused the received signal strength output 440 to fall off below a second received signal strength threshold. The detector circuit 280 may be configured to determine that the portion of the ID packet 428 was the result of a valid page based in further part either on the second received signal strength 444 being less than a second received signal strength threshold, or on the second received signal strength 444 being some amount less than the first received signal strength 442, for example.

Figure 6:
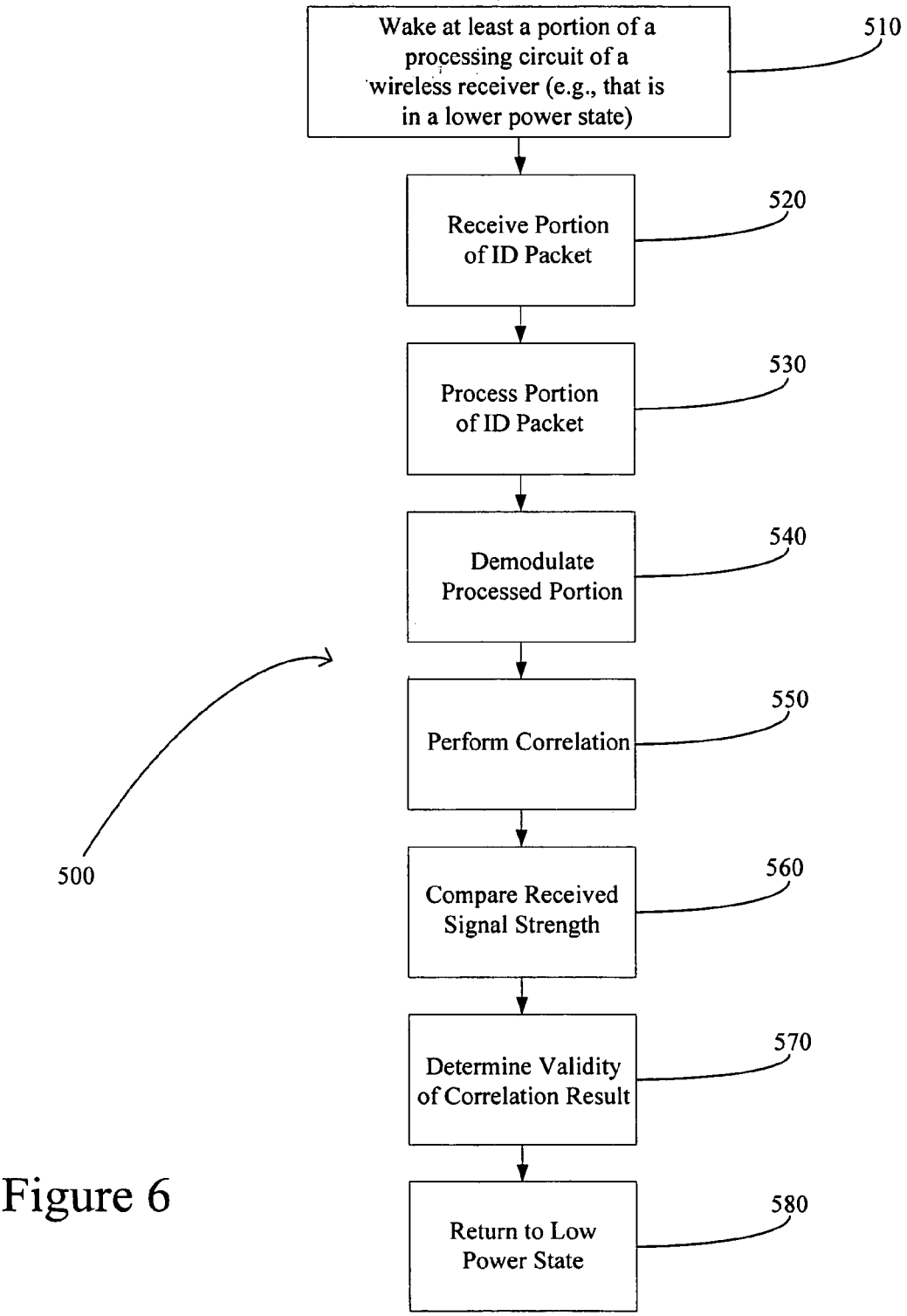
FIG. 6 is a flow chart illustrating operation of a wireless receiver according to an example embodiment.

FIG. 6 is a flow chart illustrating operation of a receiver according to an example embodiment. As shown in block 510, at least a portion of a device, or at least a portion of a wireless receiver circuit, such as at least a portion of an analog processing circuit 120 and/or signal processing circuit 250 (and/or other circuit of a wireless receiver) may wake from a low power state to an operational state. In some embodiments, waking from the low power state to the operational state may include periodically waking at least the portion of the receiver circuit from the low power state to the operational state, and then returning the at least the portion of the analog processing circuit to the low power state. In further embodiments, the at least the portion of a wireless receiver circuit (e.g., at least a portion of the analog processing circuitry and/or signal processing circuit of the receiver) may be periodically woken to an operational state for a period of time that is less than a receipt time for a full ID packet, such as less than sixty-eight microseconds (as an illustrative example), and then returned to the low power state if there was no valid page, for example.

As shown in block 520, a portion of an ID packet that is less than a full ID packet may be received while in the operational state. As shown in block 530, the portion of the ID packet may be processed to form a processed portion of the ID packet after the portion of the ID packet is received. In some embodiments, the processing the portion of the ID packet may include, for example, analog processing and/or other processing. As shown in block 540, the processed portion of the ID packet may then be demodulated. In some embodiments, the processing the portion of the ID packet shown in block 530 comprises performing analog processing on the portion of the ID packet to generate an analog processed portion of the ID packet, and demodulating the analog processed portion of the ID packet to generate a demodulated portion of the ID packet. In other embodiments, no demodulation is performed.

As shown in block 550, the processed portion of the ID packet is then correlated to generate a correlation result. The processed portion of the ID packet that is correlated may comprise the analog processed portion of the ID packet or the demodulated portion of the ID packet. The correlation result may then be compared to a correlation threshold to determine whether there was a valid page. As shown in block 580, the analog processing circuit (or portion thereof) is then returned to the low power state.

Some embodiments further comprise blocks 560 and 570. As shown in block 560, a received signal strength of the received signal may be compared to a threshold. In some embodiments, a first received signal strength of the portion of the ID packet may be compared to a first signal strength threshold at about a peak of the correlation result. In further embodiments, a second received signal strength of the portion of the ID packet may be compared to a second signal strength threshold after about the peak of the correlation threshold. As shown in block 570, the validity of the correlation result may be determined in part on either or both the comparison of the first received signal strength of the portion of the ID packet to the first signal strength threshold and the comparison of the second received signal strength to the second received signal strength threshold.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    waking at least a portion of a processing circuit of a wireless receiver from a low power state to an operational state;
    receiving, during the operational state, only a portion of an ID packet that is less than a full ID packet;
    processing the portion of the ID packet;
    correlating the processed portion of the ID packet to generate a correlation result; and
    comparing the correlation result to a correlation threshold.

2. The method of claim 1 wherein waking the at least the portion of the processing circuit comprises periodically waking the at least a portion of an analog and/or digital processing circuit from the low power state to the operational state, and then returning the at least the portion of the analog and/or digital processing circuit to the low power state.

3. The method of claim 1 wherein waking the at least the portion of the processing circuit comprises periodically waking the at least the portion of the processing circuit from the low power state to the operational state for a period of time that is less than a receipt time for a full ID packet, and then returning the at least the portion of the processing circuit to the low power state.

4. The method of claim 1 wherein waking the at least the portion of the processing circuit comprises periodically waking the at least a portion of an analog and/or digital processing circuit from the low power state to the operational state for less than sixty-eight microseconds before returning the at least the portion of the analog and/or digital processing circuit to the low power state.

5. The method of claim 1 wherein the processing the portion of the ID packet comprises:
    performing analog processing on the portion of the ID packet to generate an analog processed portion of the ID packet; and
    demodulating the analog processed portion of the ID packet to generate a demodulated portion of the ID packet;
    wherein the correlating the portion of the ID packet comprises correlating the demodulated portion of the ID packet.

6. The method of claim 1 further comprising:
    comparing, at about a peak of the correlation result, a first received signal strength of the portion of the ID packet to a first signal strength threshold; and
    determining that the correlation result is valid based at least in part on the comparing the first received signal strength to the first signal strength threshold.

7. The method of claim 6 further comprising:
    comparing, after the about the peak of the correlation result, a second received signal strength of the portion of the ID packet to a second signal strength threshold;
    wherein the determining that the correlation result is valid is further based at least in part on comparing the second received signal strength to the second signal strength threshold.

8. The method of claim 1 wherein the receiving comprises receiving, during the operational state, only a portion of a Bluetooth ID packet that is less than a full Bluetooth ID packet.

9. An apparatus comprising:
    a wireless receiver, the wireless receiver including:
        an analog processing circuit and a digital processing circuit, at least a portion of the analog processing circuit and/or digital processing circuit configured to wake from a low power state to an operational state;
        wherein the analog processing circuit is further configured to receive and process only a portion of an ID packet during the operational state, the portion of the ID packet being less than a full ID packet; and
        wherein the digital processing circuit includes:
            a correlator coupled to the analog processing circuit, the correlator being configured to correlate a processed portion of the ID packet and to output a correlation result; and
            a detector circuit configured to compare the correlation result to a correlation threshold.

10. The apparatus of claim 9 wherein the analog processing circuit comprises one or more of:
    a low noise amplifier;
    a mixer;
    an automatic gain control;
    a filter; or
    an analog-to-digital converter.

11. The apparatus of claim 9 wherein at least a portion of the analog processing circuit and/or digital processing circuit is configured to periodically wake from the low power state to the operational state and return to the low power state.

12. The apparatus of claim 9 wherein at least a portion of the analog processing circuit and/or digital processing circuit is configured to periodically wake from the low power state to the operational state for less than sixty-eight microseconds before returning to the low power state.

13. The apparatus of claim 9 wherein the wireless receiver further includes a Bluetooth wireless interface configured to receive the portion of the ID packet and transmit the portion of the ID packet to the analog processing circuit and/or digital processing circuit.

14. The apparatus of claim 9 wherein the digital processing circuit comprises:
    a demodulator configured to demodulate the processed portion of the ID packet to generate a demodulated portion of an ID packet, and transmit the demodulated portion of the ID packet to the correlator; and
    wherein the processed portion of the ID packet comprises the demodulated portion of the ID packet.

15. The apparatus of claim 14 wherein:
    the demodulator is further configured to turn at least partially off when the analog processing circuit and/or digital processing circuit is in the low power state.

16. The apparatus of claim 9 wherein the wireless receiver further includes:
    a received signal strength indicator;
    wherein the received signal strength indicator is configured to measure a first signal strength of the portion of the ID packet at about a peak of the correlation result; and
    wherein the detector circuit is configured to determine that the portion of the ID packet was valid based at least in part on the first signal strength exceeding a signal strength threshold.

17. The apparatus of claim 9 further comprising:
    a received signal strength indicator;
    wherein the received signal strength indicator is configured to measure a first signal strength of the portion of the ID packet at about a peak of the correlation result;

wherein the received signal strength indicator is further configured to measure a second signal strength of the portion of the ID packet after the about the peak of the correlation result; and the detector circuit is configured to determine that the portion of the ID packet was valid based at least in part on the first signal strength exceeding a first signal strength threshold and the second signal strength being less than a second signal strength threshold.

18. The apparatus of claim 9 wherein the portion of the ID packet comprises a portion of a Bluetooth ID packet.

19. The apparatus of claim 9 wherein the analog processing circuit is configured to return to the operational state to receive and process a full ID packet in response to the comparison of the correlation result to the correlation threshold.

20. A processing circuit adapted for operation in a wireless receiver, the processing circuit configured to:
wake at least a portion of the processing circuit of the wireless receiver from a low power state to an operational state;
receive, during the operational state, only a portion of an ID packet that is less than a full ID packet;
process the portion of the ID packet;
correlate the processed portion of the ID packet to generate a correlation result; and
compare the correlation result to a correlation threshold.

21. The processing circuit of claim 20 wherein the processing circuit is configured to wake the at least the portion of the processing circuit by periodically waking the at least a portion of an analog and/or digital processing circuit from the low power state to the operational state, and then returning the at least the portion of the analog and/or digital processing circuit to the low power state.

22. The processing circuit of claim 20 wherein the processing circuit is configured to wake the at least the portion of the processing circuit by periodically waking the at least the portion of the processing circuit from the low power state to the operational state for a period of time that is less than a receipt time for a full ID packet, and then returning the at least the portion of the processing circuit to the low power state.

23. The processing circuit of claim 20 wherein the processing circuit is configured to wake the at least the portion of the processing circuit by periodically waking the at least a portion of an analog and/or digital processing circuit from the low power state to the operational state for less than sixty-eight microseconds before returning the at least the portion of the analog and/or digital processing circuit to the low power state.

24. The processing circuit of claim 20 wherein the processing circuit is configured to process the portion of the ID packet by:
performing analog processing on the portion of the ID packet to generate an analog processed portion of the ID packet; and
demodulating the analog processed portion of the ID packet to generate a demodulated portion of the ID packet;
wherein the processing circuit is configured to correlate the portion of the ID packet by correlating the demodulated portion of the ID packet.

25. The processing circuit of claim 20 wherein the processing circuit is further configured to:
compare, at about a peak of the correlation result, a first received signal strength of the portion of the ID packet to a first signal strength threshold; and
determine that the correlation result is valid based at least in part on the comparing the first received signal strength to the first signal strength threshold.

26. The processing circuit of claim 25 wherein the processing circuit is further configured to:
compare, after the about the peak of the correlation result, a second received signal strength of the portion of the ID packet to a second signal strength threshold;
wherein the processing circuit is configured to determine that the correlation result is valid based at least in further part on comparing the second received signal strength to the second signal strength threshold.

27. The processing circuit of claim 20 wherein the processing circuit is configured to receive, during the operational state, only a portion of a Bluetooth ID packet that is less than a full Bluetooth ID packet.

* * * * *

UNITED STATES PATENT AND TRADEMARK OFFICE
CERTIFICATE OF CORRECTION

PATENT NO.       : 7,630,331 B2                          Page 1 of 1
APPLICATION NO.  : 11/527982
DATED            : December 8, 2009
INVENTOR(S)      : Steven D. Hall It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 634 days.

Signed and Sealed this

Twenty-first Day of December, 2010

David J. Kappos
*Director of the United States Patent and Trademark Office*